(12) United States Patent
Oshiro (10) Patent No.: US 6,354,676 B1
(45) Date of Patent: Mar. 12, 2002

(54) METHOD FOR CONTROLLING ELECTRONIC BRAKING FORCE DISTRIBUTION

(75) Inventor: Hiroshi Oshiro, Hamakita (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/215,535

(22) Filed: Dec. 18, 1998

(30) Foreign Application Priority Data

Dec. 19, 1997 (JP) ................................ 9-365193

(51) Int. Cl.⁷ ................................. B60T 8/74
(52) U.S. Cl. .................. 303/177; 303/122.06
(58) Field of Search ............. 303/177, 122.06, 303/113.4, 115.2, 116.2, 155, 122.07, 166

(56) References Cited

U.S. PATENT DOCUMENTS

| | | | | |
|---|---|---|---|---|
| 5,333,944 A | * | 8/1994 | Shirai et al. | 303/177 |
| 5,575,542 A | * | 11/1996 | Tanaka et al. | 303/177 X |
| 5,647,647 A | * | 7/1997 | Kato et al. | 303/177 X |
| 6,045,199 A | * | 4/2000 | Toyoda | 303/122.06 X |

* cited by examiner

Primary Examiner—Matthew C. Graham
Assistant Examiner—Melanie Torres
(74) Attorney, Agent, or Firm—Arent Fox Kintner Plotkin & Kahn, PLLC (57) ABSTRACT

Electronic braking force distribution control initiation is properly judged. Upon pressurizing the brake pedal, if the estimated vehicle deceleration or the vehicle wheel deceleration becomes larger than a threshold value, electronic braking force distribution control by controlling the rear wheel inlet and outlet valves is initiated. The deceleration threshold value is varied based on the degree of pressure applied stepping on the brake pedal.

7 Claims, 8 Drawing Sheets

METHOD FOR CONTROLLING ELECTRONIC BRAKING FORCE DISTRIBUTION

BACKGROUND OF INVENTION

This invention relates to a method for controlling the electronic distribution of braking force for a vehicle.

Traditionally, a method for controlling the electronic braking force distribution initiates control only when the rear wheel speed is slower relative to the front wheel speed. However, under this method, when a quick, hard brake pedal action is applied, an initial control point may be delayed, which can cause larger slip in the rear wheels and could prevent accurate electronic braking force distribution control.

OBJECTS OF THE INVENTION

An object of this invention is to provide an appropriate initiation of electronic braking force distribution control.

This invention is a method for controlling an electronic braking force distribution in a hydraulic device for a vehicle braking system, which comprises a hydraulic unit comprising a main hydraulic circuit which connects a master cylinder and a wheel cylinder via an inlet valve and an auxiliary hydraulic circuit which connects the wheel cylinder and an auxiliary reservoir via an outlet valve and an electronic control device which controls the hydraulic unit, the method comprising the steps of: determining a degree of pressure applied on the brake pedal, determining estimated vehicle deceleration or vehicle wheel deceleration, controlling the inlet valve and the outlet valve for the rear wheels of the vehicle when the estimated vehicle deceleration or the vehicle wheel deceleration becomes larger than a threshold deceleration value upon pressing the brake pedal, for the purpose of conducting the electronic braking force distribution control, and changing the threshold deceleration value by the degree of the pressure applied on the brake pedal.

This invention further is a method for controlling the electronic braking force distribution as above, wherein the braking force distribution control is initiated when the estimated vehicle deceleration or the vehicle wheel deceleration becomes larger than the threshold deceleration value and the rear wheels slip ratio relative to the estimated vehicle speed becomes larger than a predetermined slip value.

This invention still further is a method for controlling the electronic baking force distribution as above, wherein in the case that, upon pressurizing the brake pedal, the variations in the estimated vehicle deceleration or the vehicle wheel deceleration become larger than a predetermined deceleration value and continue to be larger than a predetermined deceleration value for a predetermined time, the threshold deceleration value for the estimated vehicle deceleration or the vehicle wheel deceleration is set to be smaller than when the variations in the estimated vehicle deceleration or the vehicle wheel deceleration become smaller than that predetermined deceleration value or do not continue to be larger than that predetermined deceleration value for that predetermined time.

This invention yet further is a method for controlling the electronic braking force distribution as above, wherein the case that, upon pressing the brake pedal, the variations of estimated vehicle deceleration or the vehicle wheel deceleration become larger than the predetermined deceleration value or do not continue to be larger than the predetermined deceleration value for the predetermined time, the electronic braking force distribution control is initiated when the estimated vehicle deceleration or the vehicle wheel deceleration becomes larger than the predetermined deceleration value and the rear wheel slip relative to front wheel is larger than the predetermined slip value.

This invention yet further is a method for controlling the electronic braking force distribution as above, wherein the case that, upon pressurizing the brake pedal, the variations of the estimated vehicle deceleration or the vehicle wheel deceleration are larger than the predetermined deceleration value and continue to be larger than the predetermined deceleration value for the predetermined time, the predetermined value of rear wheel slip ratio is set smaller than the rear wheel slip ratio relative to the front wheels when the variations are smaller than the predetermined deceleration value or do not continue to be larger than the predetermined deceleration value for the predetermined time.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Embodiments of this invention are explained with reference to the figures.

Figure 1:
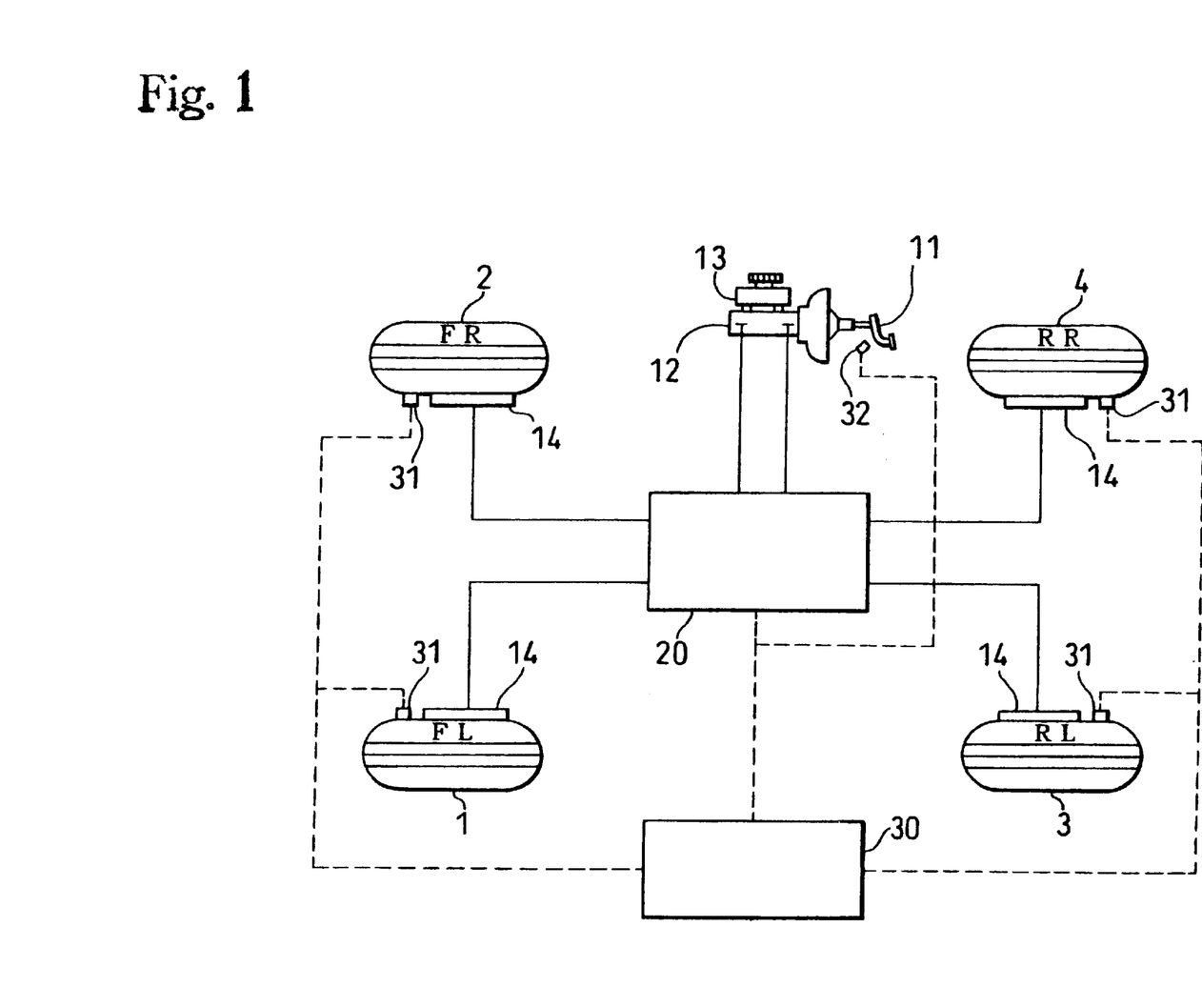
FIG. 1 is a summary view of the brake control device.

In a hydraulic device for a vehicle brake, as shown in FIG. 1, hydraulic pressure created at the master cylinder 12 is supplied through the hydraulic unit 20 to the respective front and rear wheels to conduct brake control on the respective wheels (front left wheel 1, front right wheel 2, rear left wheel 3, rear right wheel 4). For instance, in an electronic braking force distribution and an antilock brake control system (ABS), the hydraulic unit 20 is controlled by the electronic control device 30 to conduct appropriate brake control relative to the respective wheels, based on signals from the wheel speed sensor 31 and the brake pedal switch 32. In addition, the electronic control device 30 may be a general computer device such as a microcomputer programmed appropriately.

Figure 2:
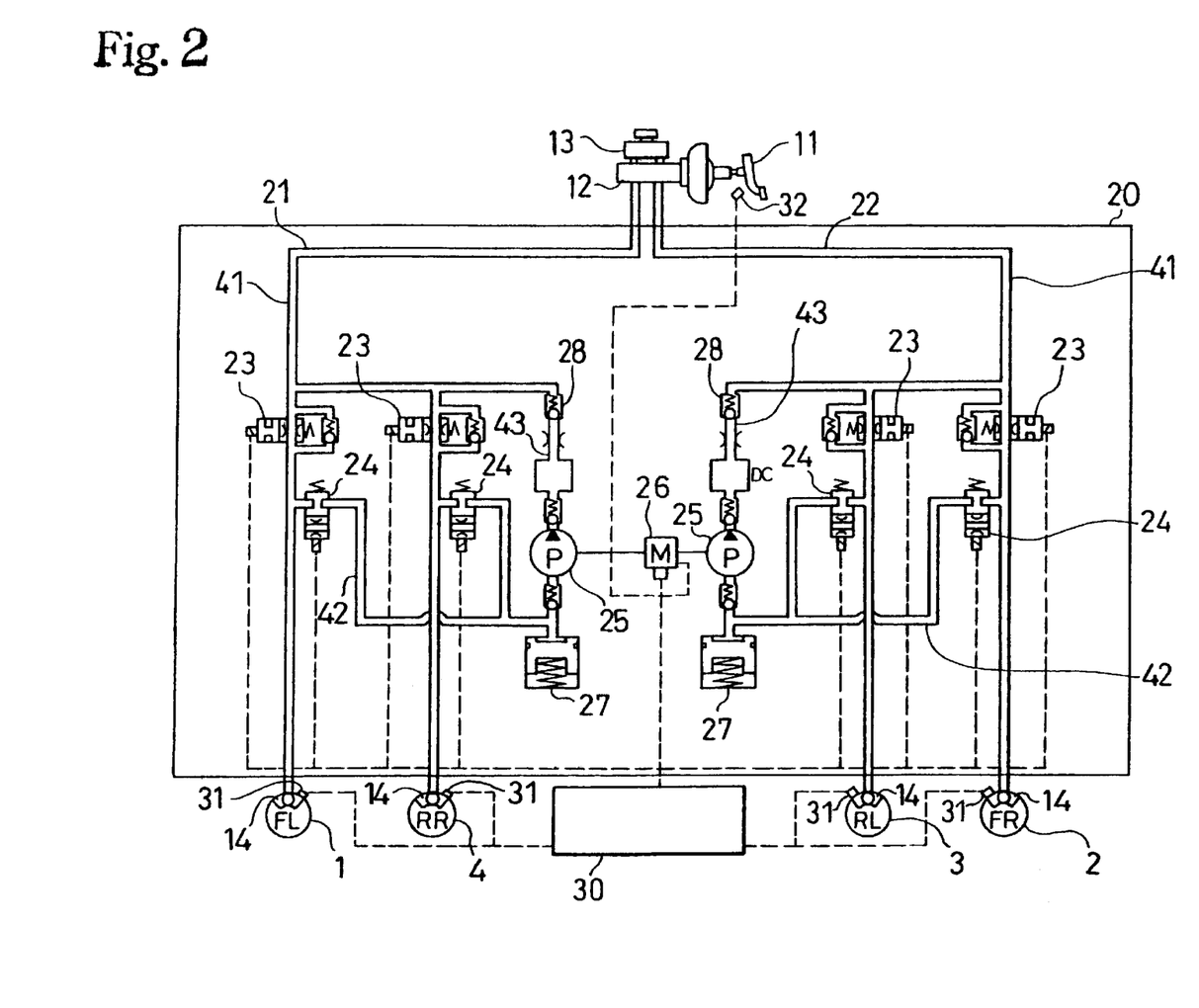
FIG. 2 is a view of the hydraulic device for a vehicle braking system having four wheels.

An example of the hydraulic unit 20 is shown in FIG. 2. This unit 20 is equipped with hydraulic circuits for brake control, wherein the front left wheel 1 and the rear right wheel 4 are connected to a first hydraulic circuit 21 and the front right wheel 2 and the rear left wheel 3 are connected to another independent second hydraulic circuit 22.

Each hydraulic circuit 21 or 22 comprises a main hydraulic line 41 connecting the wheel cylinders of the respective wheels and the master cylinder 12 via an inlet valve 23, an auxiliary hydraulic circuit 42 connecting an auxiliary reservoir 27 and the wheel cylinders 14 via an outlet valve 24 for the respective wheel, and a hydraulic return circuit 43 returning from the auxiliary reservoir 27 to the main hydraulic line 41 via a pump 25. The hydraulic unit 20 conducts certain brake control of the respective wheel cylinders by opening and closing of the inlet valves 23 and the outlet valves 24. Further, a main reservoir 13 is provided for the brake fluid. Reverse stopper valves 28 are provided to prevent reverse flow. A motor 26 controls the operation of the pumps 25.

The operation of the hydraulic device for a vehicle braking system is explained next.

Figure 3:
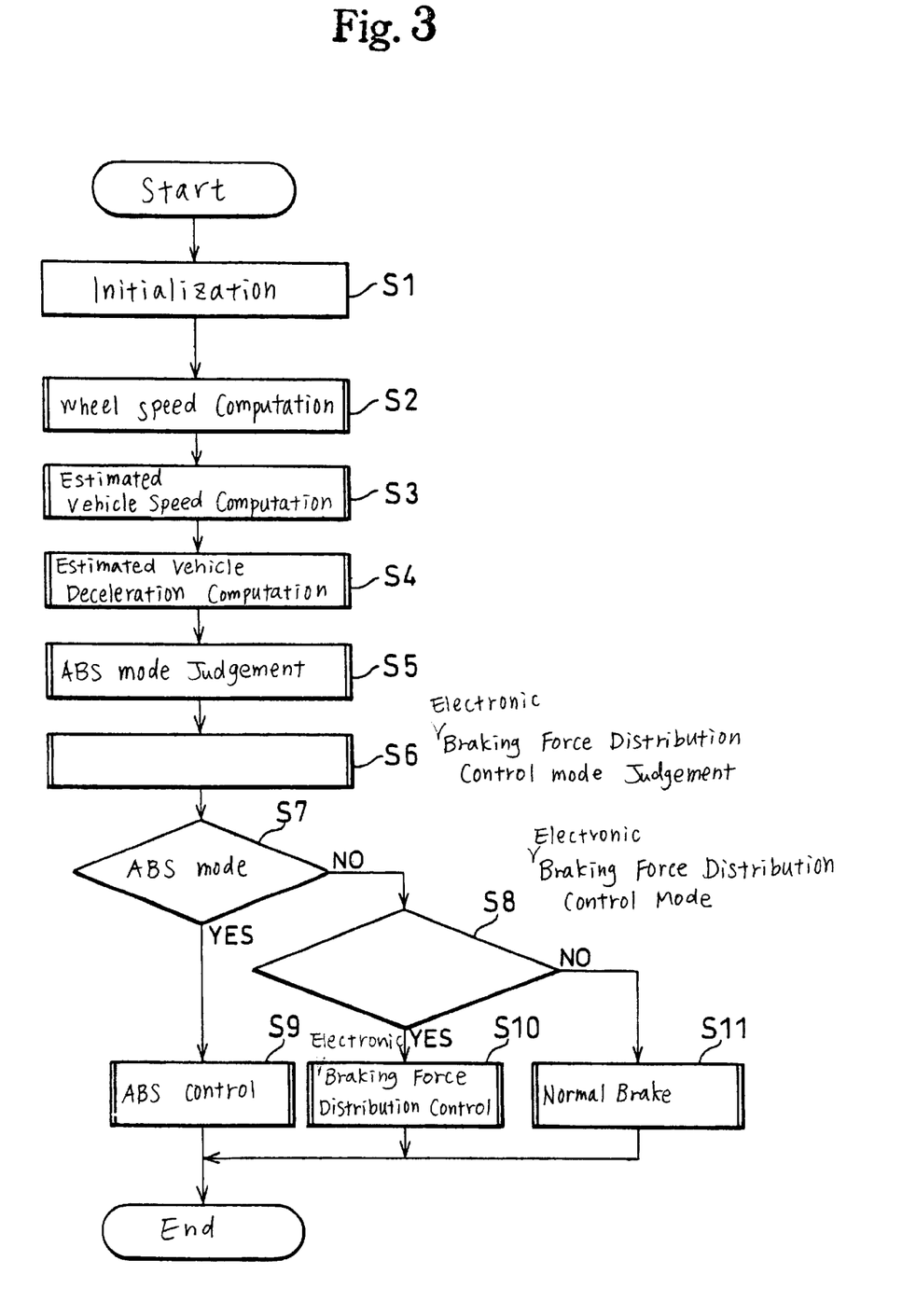
FIG. 3 is a flowchart of brake control.

The electronic control device 30, as set forth in FIG. 3, conducts a computation for brake control using signals such as from the wheel speed sensors 31 and the brake pedal switch 32. First, the device 30 is initialized (SI). Signals from each wheel speed sensor 31 are used to determine the wheel speeds (S2). The estimated vehicle speed, the estimated vehicle deceleration, etc. are determined from the calculation based upon the signals from the wheel speed sensors 31 (S3, S4). The values so determined are used to determine the parameters such as the predetermined values (discussed below) to set the respective mode of the brake control such as antilock brake control or electronic braking force distribution control (S5, S6). If antilock brake control mode (S7) is initiated, antilock brake control is conducted (S9), and if not, the electronic braking force distribution control mode is used (S8). If electronic braking force distribution control mode (S8) is initiated, electronic braking force distribution control is conducted (S10), and if not (S8), normal braking is conducted (S11).

In normal braking, when the brake pedal 11 is pressed, the hydraulic pressure for braking is created in the master cylinder 12 and directly acts at the respective wheel cylinders 14 since the outlet valves 24 are normally closed and the inlet valves 23 are normally open, thereby braking the respective wheels, 1, 2, 3, 4.

The electronic control device 30, when the vehicle wheels are locked upon braking, conducts antilock brake control by opening and closing control of the respective inlet valve 23, the respective outlet valve 24 and control of the particular pump 25.

During antilock brake control, to control the hydraulic pressure for braking, the pressure increase mode, the pressure hold mode, and the pressure decrease mode are repeated at every cycle. In the pressure increase mode of the first cycle, for example, open-close control is conducted at the respective inlet valve 23, where the outlet valve 24 is closed to increase the pressure of the brake fluid of the wheel cylinder 14.

Figure 4:
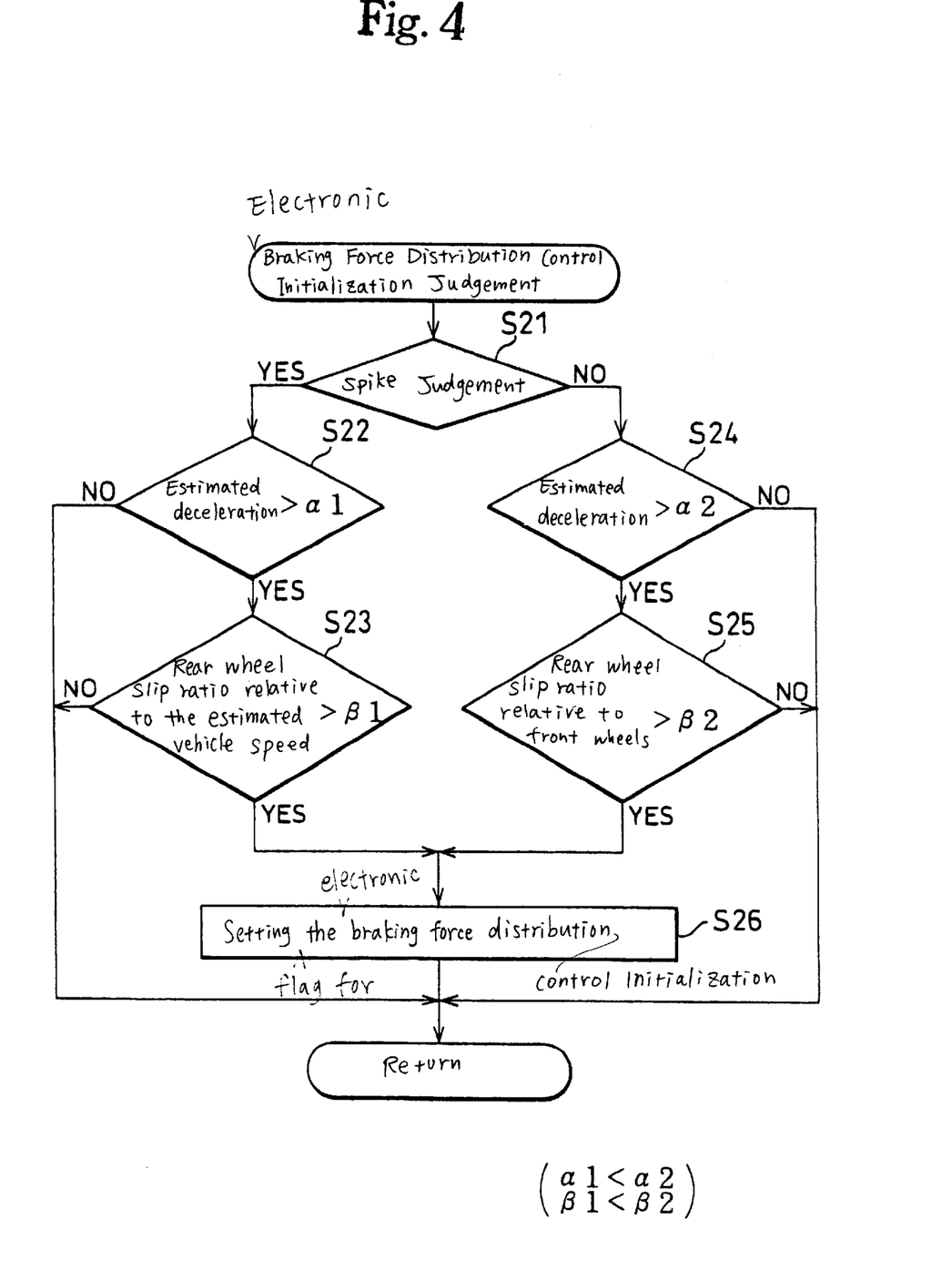
FIG. 4 is a flowchart of determining the electronic braking force distribution control initiation.

FIG. 4 shows the initiation step of braking force distribution control wherein the prerequisite for control of the braking force of the brakes of rear wheels is determined. To begin with, the initiation prerequisite is determined from the degree and speed of the pressing of the brake pedal 11 by a user, the so-called spike judgment. The spike judgment is determined based upon the variation of the estimated vehicle deceleration or vehicle wheel deceleration, e.g., the difference between the estimated deceleration of the current cycle and that of the previous cycle after computing the estimated vehicle deceleration or vehicle wheel deceleration at every cycle (e.g., 7 ms). Then, a judgment is made that the brake pedal is pressed hard or strongly pressed when the difference is larger than a first predetermined deceleration value and continues to be larger for a predetermined time (S21).

If the brake pedal is judged to be pressed hard and the estimated deceleration is larger than the first predetermined deceleration value ($\alpha 1$), the method proceeds to step S23. However if the brake pedal is not judged to be pressed hard or the estimated deceleration is not larger than the first predetermined deceleration value ($\alpha 1$), the electronic braking force distribution control is not conducted (S22). In step S23, if the rear wheel slip ratio relative to the estimated vehicle speed is determined to be larger than a first predetermined slip value ($\beta 1$), the method proceeds to step S26. However, if the rear wheel slip ratio relative to the estimated vehicle speed is not larger than the first predetermined slip value such control is not conducted (S23). In step S26, the control initiation flag for conducting the electronic braking force distribution control is set (S26).

When at the spike judgment, if the brake pedal is not judged to be pressed hard and the estimated deceleration is larger than a second predetermined deceleration value ($\alpha 2$), the method proceeds to step S25. The second predetermined deceleration value $\alpha 2$ is larger than the first predetermined deceleration value $\alpha 1$. However, if the estimated deceleration is not larger than the second predetermined deceleration value, the electronic braking force distribution control is not initiated (S24). In step S25, if the rear wheel slip ratio relative to the front wheels is determined to be larger than a second predetermined slip value ($\beta 2$), the method proceeds to step S26. The second predetermined slip value $\beta 2$ is larger than the first predetermined slip value $\beta 1$. However, if the rear wheel slip ratio relative to the front wheels is not larger than the second predetermined slip value, such control is not conducted (S25).

As such, when the brake pedal is not judged to be pressed hard, in the front and rear wheel braking force distribution, the electronic braking force distribution control is set to be initiated near a level where the rear wheels tend to lock before the front wheels.

Accordingly, by initiating the electronic braking force distribution control, proper electronic braking force control is conducted before the rear wheel slip becomes larger.

Electronic Braking Force Distribution is designed for specific control of the hydraulic pressure for a braking system of the rear wheel cylinders. For example, instead of a proportional valve (P valve) in the hydraulic circuit, the hydraulic pressure of the rear wheel cylinder is to be electronically controlled (operating the respective inlet and outlet valves) to maintain the rear wheel hydraulic pressure low relative to the front wheel hydraulic pressure. In addition, in the antilock brake control device, when the motor or the pump fails and the antilock brake control is not conducted, the rear wheel slip is controlled specifically by the electronic braking force distribution controls.

Figure 5:
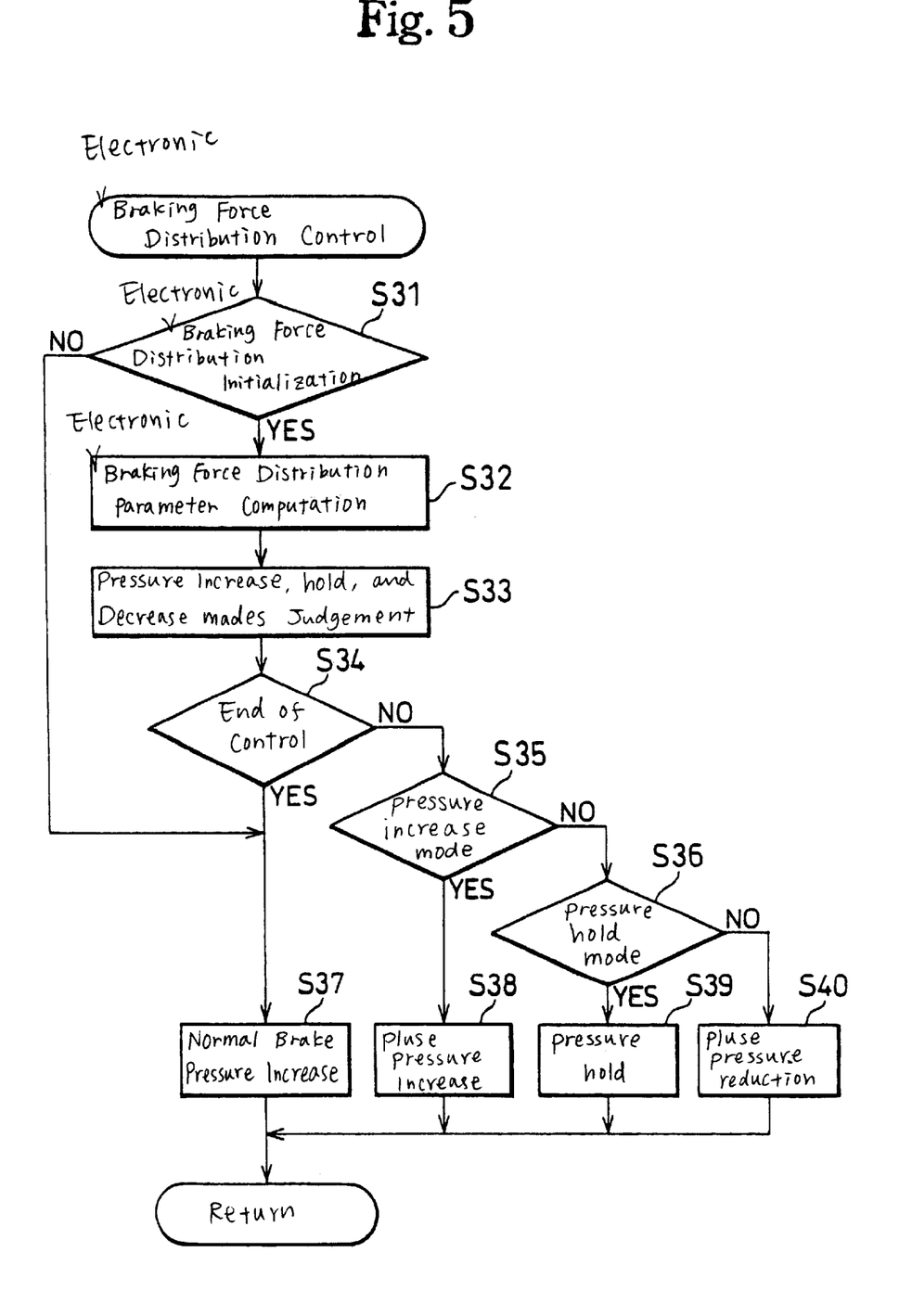
FIG. 5 is a flowchart of the electronic braking force distribution control.

Electronic braking force distribution control is conducted as shown in the flowchart of FIG. 5, by determining whether the electronic braking force distribution control is initiated or not (S31) and by increasing the pressure in the normal brake when the initiation flag is not set (S37). When the initiation flag is set, the necessary parameter for the electronic braking force distribution control of the rear wheel slip ratio relative to the front wheels is determined (S32). The hydraulic pressure increase hold, or decrease control mode is judged by such as the parameter determined (S33). Then, whether to stop the electronic braking force distribution control is decided (S34), and the normal brake is conducted if such distribution control is stopped (S37). If not stopped, depending upon the brake control mode selected at step S33, steps S35 and S36 are considered to be conducted as a rear wheel cylinder hydraulic pressure increase mode (S38), hold mode (S39), or decrease mode (S40).

Figure 6:
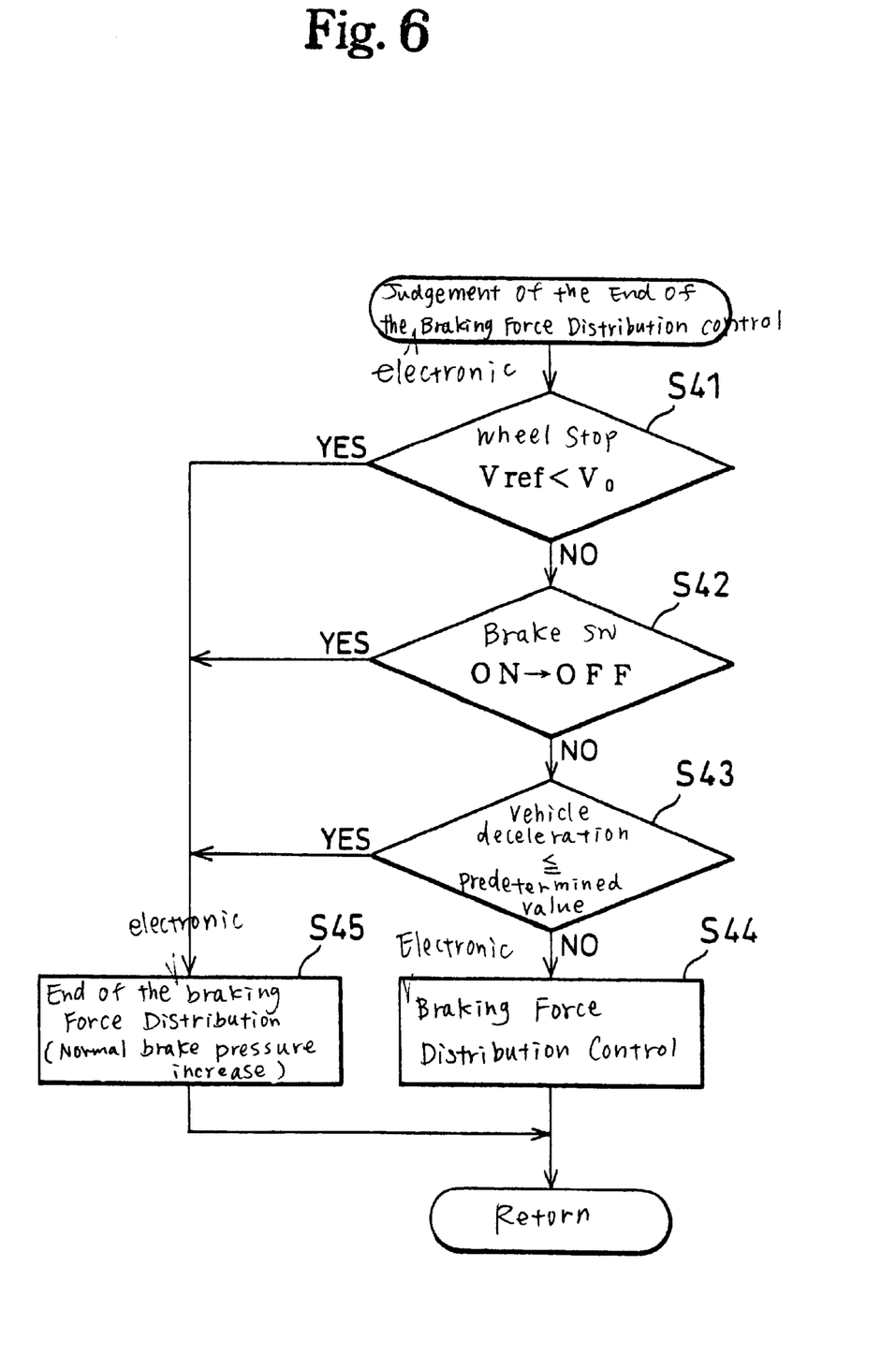
FIG. 6 is a flowchart of stopping the electronic braking force distribution control.

Electronic braking force distribution control must be ended as soon as the vehicle returns to a stable condition. For this purpose, FIG. 6 shows the judgment steps to check whether the vehicle is driving slow and is close to stopping in which case electronic braking force distribution control may almost never be necessary (S41). For example, whether the estimated vehicle speed Vref is smaller than a predetermined speed value Vo is determined to see if the vehicle is close to stopping. If it is judged that the vehicle is close to stopping, normal brake is selected (S45).

When the estimated vehicle speed Vref is more than predetermined speed value Vo, the method checks whether the brake switch (SW) is on or off (S42). When the brake switch switches to off from on, the brake operation is considered to be ended and the electronic braking force distribution control is stopped and the system uses normal brake (S45) instead. When the brake switch is still on, the method checks whether the vehicle deceleration is lower than a third predetermined deceleration value (S43). When the vehicle deceleration is lower than the third predetermined deceleration value Dth, normal brake is conducted (S45). If the vehicle deceleration is more than the third predetermined deceleration value, the electronic braking force distribution control is conducted (S44).

Accordingly, if the vehicle deceleration is smaller than the third predetermined deceleration value, the distribution control is ended earlier by stopping electronic braking force distribution control.

In addition, in step S43, the predetermined value Dth is variable and is determined depending upon the size of the vehicle deceleration value Bth at the electronic braking force distribution control initiation. For instance, the vehicle deceleration, which is a predetermined difference value Δth smaller than the vehicle deceleration at the initiation, (Bth−Δth), may be set to be the predetermined value Dth.

Accordingly, by setting the predetermined value Dth variable by the vehicle deceleration value Bth at the control initiation, distribution control may be stopped earlier with more certainty. Here, the predetermined difference value Δth may be a linear function having the vehicle deceleration value Bth as a variable to vary the predetermined value Dth.

Figure 7:
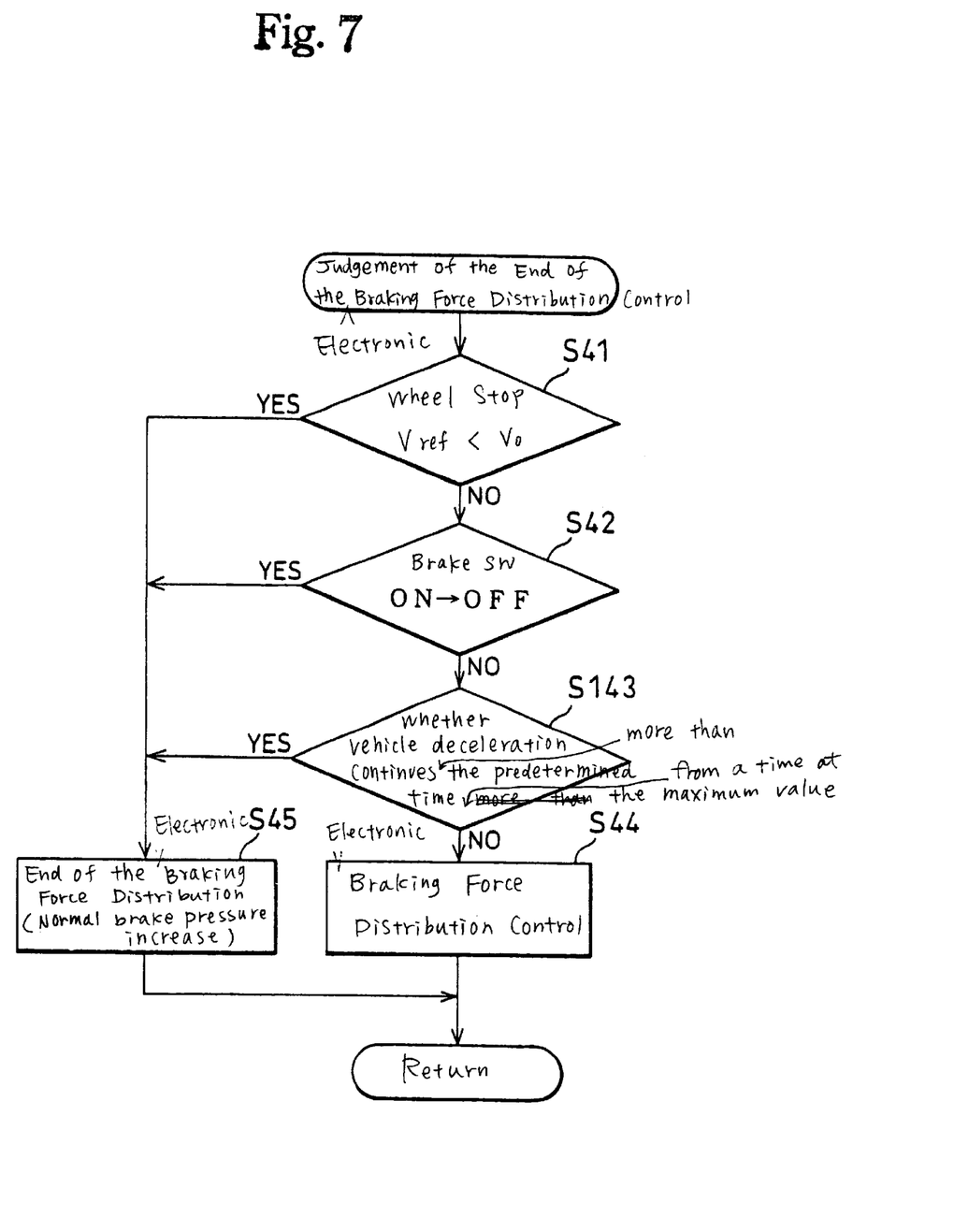
FIG. 7 is another flowchart of stopping the electronic braking force distribution control.

Instead of the vehicle deceleration value of step S43 in FIG. 6, as step S143 of FIG. 7, whether the vehicle deceleration continues for a time which is smaller than a predetermined time Tth or not is determined taking the peak value (maximum value) P time of the vehicle deceleration as a standard. That is, the distribution control is stopped at the predetermined time Tth from the maximum value P, or the predetermined time Tth is varied based upon the size of the vehicle deceleration maximum value P. For instance, Tth= Ta+A (P−Pa), and predetermined time Tth may be a linear function of P.

Figure 8:
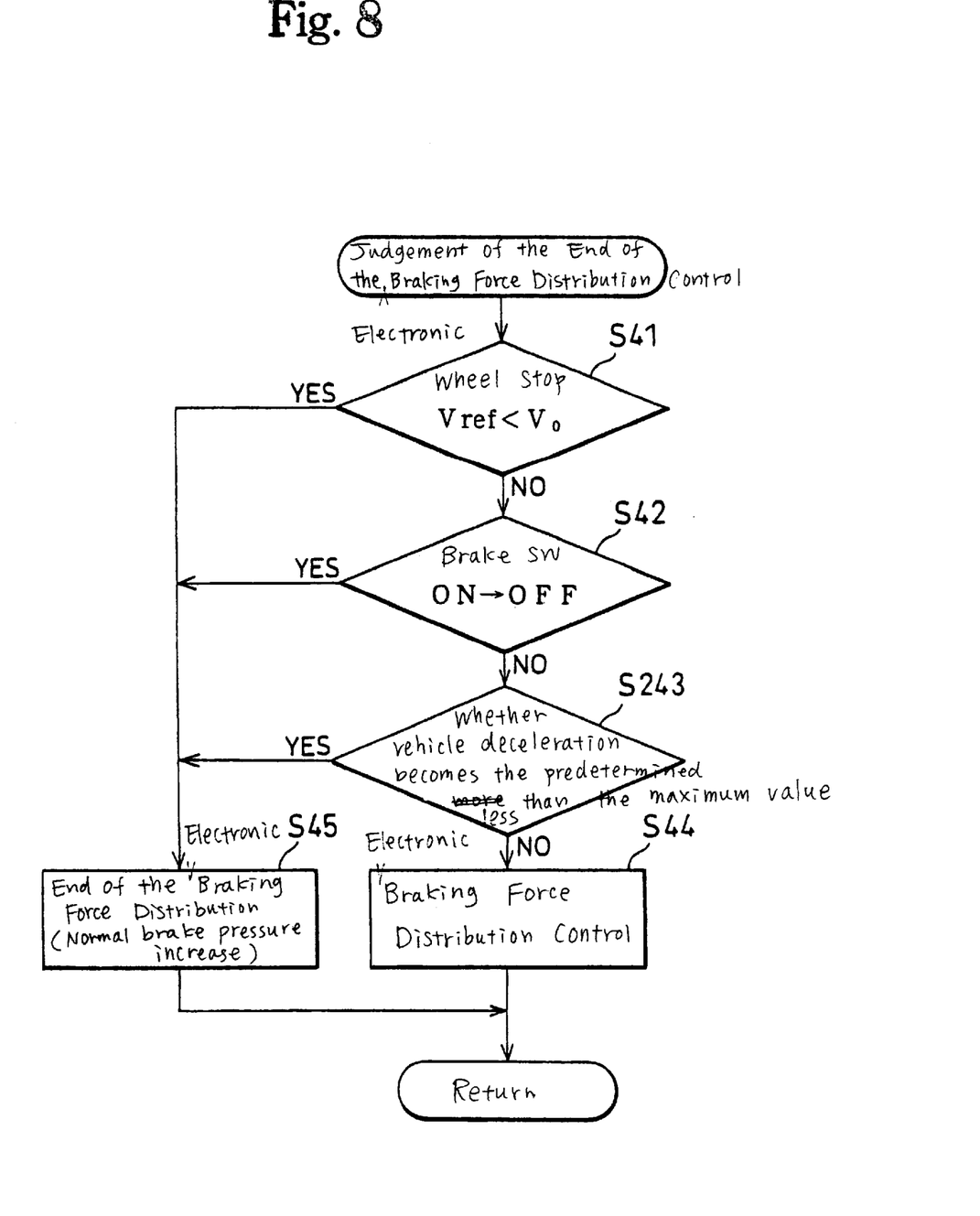
FIG. 8 is another flowchart of stopping the electronic braking force distribution control.

Instead of the vehicle deceleration value of step S43 in FIG. 6 or step S143 of FIG. 7, as step S243 of FIG. 8, electronic braking force distribution control is stopped when the decrease of the vehicle deceleration becomes a predetermined value δ more than the peak value P (maximum value). That is, when the vehicle deceleration becomes smaller than the vehicle deceleration (P−δth) which is δth less taking the maximum value P as a standard deceleration, the control is stopped. Further, taking predetermined value δth as a linear function of the maximum value P, the vehicle deceleration (P−δth) may be variable.

This invention has the following advantages.

This invention enables the selection of an accurate initiation time for electronic braking force distribution control and the conducting of proper electronic braking force distribution control.

Proper electronic braking force distribution control prior to the rear wheel slip becoming larger is possible, thereby obtaining a vehicle stability.

It is readily apparent that the above-described has the advantage of wide commercial utility. It should be understood that the specific form of the invention hereinabove described is intended to be representative only, as certain modifications within the scope of these teachings may be apparent to those skilled in the art.

Accordingly, reference should be made to the following claims in determining the full scope of the invention.

What I claim is:

1. A method for controlling the electronic braking force distribution in a hydraulic device for a vehicle braking system, which comprises a hydraulic unit comprising a main hydraulic circuit which connects a master cylinder and a wheel cylinder via an inlet valve and an auxiliary hydraulic circuit which connects the wheel cylinder and an auxiliary reservoir via an outlet valve and an electronic control device which controls the hydraulic unit, said method comprising the steps of:

determining a degree of pressure applied on the brake pedal, determining estimated vehicle deceleration or vehicle wheel deceleration, controlling the inlet valve and the outlet valve for the rear wheels of the vehicle when the estimated vehicle deceleration or the vehicle wheel deceleration becomes larger than a threshold deceleration value upon pressing the brake pedal, for the purpose of conducting said electronic braking force distribution control, changing the threshold deceleration value by the degree of the pressure applied on the brake pedal, determining a rear wheel slip ratio, determining estimated vehicle speed, and initiating the electronic braking force distribution control when the estimated vehicle deceleration or vehicle wheel deceleration becomes larger than the threshold deceleration value and the rear wheel slip ratio relative to the estimated vehicle speed becomes larger than a predetermined slip value wherein, when upon pressurizing the brake pedal, if variations in the estimated vehicle deceleration or vehicle wheel deceleration become larger than a predetermined deceleration value and continue to be longer than a predetermined time, the threshold deceleration value for the estimated vehicle deceleration or vehicle wheel deceleration is to be smaller than when the variations in the estimated vehicle deceleration or vehicle wheel deceleration become smaller than the predetermined deceleration value or do not continue to be longer than the predetermined time.

2. A method for controlling the electronic braking force distribution in a hydraulic device for a vehicle braking system, which comprises a hydraulic unit comprising a main hydraulic circuit which connects a master cylinder and a wheel cylinder via an inlet valve and an auxiliary hydraulic circuit which connects the wheel cylinder and an auxiliary reservoir via an outlet valve and an electronic control device which controls the hydraulic unit, said method comprising the steps of:

determining a degree of pressure applied on the brake pedal, determining estimated vehicle deceleration or vehicle wheel deceleration, controlling the inlet valve and the outlet valve for the rear wheels of the vehicle when the estimated vehicle deceleration or the vehicle wheel deceleration becomes larger than a threshold deceleration value upon pressing the brake pedal, for the purpose of conducting said electronic braking force distribution control, changing the threshold deceleration value by the degree of the pressure applied on the brake pedal, determining a rear wheel slip ratio, determining estimated vehicle speed, and initiating the electronic braking force distribution control when the estimated vehicle deceleration or vehicle deceleration becomes larger than the threshold deceleration value and the rear wheel slip ratio relative to the estimated vehicle speed becomes larger than a predetermined slip value, wherein when upon pressurizing the brake pedal, if variations of estimated vehicle distribution do not become larger than a predetermined deceleration value or do not continue to be longer than a predetermined time, the braking force distribution control is initiated if the estimated vehicle deceleration or vehicle wheel deceleration becomes larger than the predetermined deceleration value and the rear wheel slip relative to front wheels is larger than a predetermined slip value.

3. The method for controlling the electronic braking force distribution as claimed in claim 1, wherein when upon pressurizing said brake pedal, variations of the estimated vehicle deceleration or the vehicle deceleration are larger than a predetermined deceleration value and continue to be longer than a predetermined time, setting a predetermined value of rear wheel slip ratio relative to the front to be smaller than the rear wheel slip ratio relative to the front wheels in the case that the variations are smaller than the predetermined deceleration value or do not continue to be longer than the predetermined time.

4. A method for initiating an electronic braking force distribution for controlling brakes of rear wheels of a vehicle having a brake pedal, comprising the steps of:

pressing the brake pedal thereby braking the vehicle;

estimating a vehicle deceleration value upon pressing the brake pedal;

determining whether the brake pedal is hard pressed;

if the brake pedal is determined to be hard pressed, determining whether the estimated vehicle deceleration value is greater than a first predetermined deceleration value;

if the estimated vehicle deceleration value is greater than the first predetermined deceleration value, determining whether a rear wheel slip ratio relative to an estimated vehicle speed is larger than a first predetermined slip value;

if the estimated vehicle deceleration value is greater than the first predetermined deceleration value and if the rear wheel slip ratio is larger than a first predetermined slip value, then initiating the electronic braking force distribution;

and if the brake pedal is determined not to be hard pressed, determining whether the estimated vehicle deceleration value is greater than a second predetermined deceleration value being larger than the first predetermined deceleration value;

if the estimated vehicle deceleration value is greater than the second predetermined deceleration value, determining whether the rear wheel slip ratio is larger than a second predetermined rear wheel ratio being larger than the first predetermined rear wheel ratio; and if the estimated vehicle deceleration value is greater than the second predetermined deceleration value and the rear wheel slip ratio is larger than the second predetermined rear wheel ratio, then initiating the electronic braking force distribution.

5. A method according to claim 4, wherein the brake pedal is determined to be hard pressed if a difference between the estimated vehicle deceleration value of a current cycle and the estimated vehicle deceleration value of a previous cycle is greater than the first predetermined deceleration value and continues to be larger for a predetermined period of time.

6. A method for controlling the electronic braking force distribution in a hydraulic device for a vehicle braking system comprising a hydraulic unit with a main hydraulic circuit which connects a master cylinder and a wheel cylinder via an inlet valve and an auxiliary hydraulic circuit which connects the wheel cylinder and an auxiliary reservoir via an outlet valve and an electronic control device which controls the hydraulic unit, said method comprising the steps of:

determining a degree of pressure applied on the brake pedal, determining estimated vehicle deceleration or vehicle wheel deceleration, and controlling the inlet valve and the outlet valve for the rear wheel of the vehicle when the estimated vehicle deceleration or the vehicle wheel deceleration becomes larger than a threshold deceleration value upon pressing the brake pedal for the purpose of conducting said electronic braking force distribution control, wherein the threshold deceleration value is changed by the degree of the pressure applied on the brake pedal.

7. A method for controlling the electronic braking force distribution in a hydraulic device for a vehicle braking system comprising a hydraulic unit with a main hydraulic circuit which connects a master cylinder and a wheel cylinder via an inlet valve and an auxiliary hydraulic circuit which connects the wheel cylinder and an auxiliary reservoir via an outlet valve and an electronic control device which controls the hydraulic unit, said method comprising the steps of:

determining the degree of pressure applied on the brake pedal, determining estimated vehicle deceleration or vehicle wheel deceleration, and controlling the inlet valve and the outlet valve for the rear wheel of the vehicle when the estimated vehicle deceleration or the vehicle wheel deceleration becomes larger than a threshold deceleration value upon pressing the brake pedal for the purpose of conducting said electronic braking force distribution control, wherein the threshold deceleration value is changed by the degree of the pressure applied on the brake pedal, and said electronic braking force distribution control is initiated when the estimated vehicle deceleration or vehicle wheel deceleration becomes larger than the threshold deceleration value when the rear wheel slip ratio relative to the estimated vehicle speed becomes larger than a predetermined slip value.

* * * * *